US008886866B2

(12) United States Patent
Arcese et al.

(10) Patent No.: US 8,886,866 B2
(45) Date of Patent: Nov. 11, 2014

(54) OPTIMIZING MEMORY MANAGEMENT OF AN APPLICATION RUNNING ON A VIRTUAL MACHINE

(75) Inventors: Mauro Arcese, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 13/290,461

(22) Filed: Nov. 7, 2011

(65) Prior Publication Data

US 2012/0137101 A1 May 31, 2012

(30) Foreign Application Priority Data

Nov. 30, 2010 (EP) .................................. 10193128

(51) Int. Cl.
*G06F 12/00* (2006.01)
*G06F 9/50* (2006.01)
(52) U.S. Cl.
CPC .................... *G06F 9/5016* (2013.01)
USPC ........................................................... 711/6
(58) Field of Classification Search
None
See application file for complete search history.

(56) References Cited

U.S. PATENT DOCUMENTS

| | | | |
|---|---|---|---|
| 6,349,312 B1 | 2/2002 | Fresko et al. | |
| 7,392,269 B2* | 6/2008 | Chauvel ........................ | 707/700 |
| 7,516,292 B2 | 4/2009 | Kimura et al. | |
| 2003/0196062 A1 | 10/2003 | Valentin et al. | |
| 2004/0221121 A1 | 11/2004 | Hamilton et al. | |
| 2005/0114621 A1 | 5/2005 | Lahiri et al. | |
| 2006/0075204 A1* | 4/2006 | Kumar .......................... | 711/173 |
| 2007/0136402 A1 | 6/2007 | Grose et al. | |
| 2008/0147705 A1 | 6/2008 | Bansal et al. | |
| 2009/0187614 A1 | 7/2009 | Clee et al. | |
| 2009/0235247 A1* | 9/2009 | Cho et al. ........................ | 718/1 |
| 2009/0265707 A1 | 10/2009 | Goodman et al. | |
| 2009/0300092 A1* | 12/2009 | Corry et al. ................... | 709/202 |
| 2010/0077128 A1 | 3/2010 | Stansell et al. | |
| 2010/0274947 A1* | 10/2010 | Ohta et al. ........................ | 711/6 |
| 2010/0287352 A1* | 11/2010 | Chapman et al. ............. | 711/170 |

OTHER PUBLICATIONS

Examination Report for United Kingdom Patent Application No. GB1311605.8 dated Oct. 11, 2013, pp. 1-3.

(Continued)

*Primary Examiner* — Matthew Bradley
*Assistant Examiner* — Daniel Tsui
(74) *Attorney, Agent, or Firm* — Winstead, P.C.

(57) ABSTRACT

A method, system and computer program product for optimizing memory usage of an application running on a virtual machine. A virtual machine memory block is pre-allocated and the average memory usage of the virtual machine is periodically computed using statistics collected from the virtual machine through an API. If the memory usage average becomes higher than a maximum threshold, then a recovery mode is entered by releasing the virtual machine memory block and forcing the running application to reduce its processing activity; optionally, a garbage collector cycle can be forced. If the computed memory usage average becomes lower than a minimum threshold value, which is lower than the maximum threshold value, then a normal mode is entered by re-allocating the virtual machine memory block and forcing the running application to resumes its normal processing activity. Optionally, when the virtual machine is idle, a deep garbage collection is forced.

24 Claims, 5 Drawing Sheets

(56) References Cited

OTHER PUBLICATIONS

International Search Report and Written Opinion of the International Searching Authority for International Application No. PCT/EP2011/069318 dated Jan. 18, 2012.

Boyland, John, "Position Paper: Handling 'Out of Memory' Errors," ECOOP EHWS, Jul. 25, 2005.

Agrawal et al., "Improving Memory Performance of Embedded Java Applications by Dynamic Layout Modifications," Proceedings of the 18th International Parallel and Distributed Processing Symposium (IPDPS '04), Apr. 26-30, 2004.

* cited by examiner

OPTIMIZING MEMORY MANAGEMENT OF AN APPLICATION RUNNING ON A VIRTUAL MACHINE

CROSS-REFERENCE TO RELATED APPLICATIONS

This application claims priority under 35 U.S.C. §119(a) from European Patent Application No. 10193128.5, filed on Nov. 30, 2010, the contents of which are incorporated herein by reference.

TECHNICAL FIELD

The present invention relates to applications executed in a virtual machine, such as an application developed in Java® (Java and all Java-based trademarks and logos are trademarks or registered trademarks of Oracle and/or its affiliates) language and executing in a Java® virtual machine, and more particularly, to improving memory management of applications running in a virtual machine.

BACKGROUND

An application running in a virtual machine may encounter several kinds of severe conditions that may come from over use of computing resources, and, in particular, of memory. If the amount of memory used by an application exceeds the memory allocated to the virtual machine, or, if the virtual machine, or, if the system, hosting the virtual machine exceeds the available memory, this can result in an "out of memory" exception making the application or the virtual machine to crash. A crash may be detrimental for enterprise applications stopped during production hours or if the application in question manages and controls computing activity over multiple locations of the same enterprise. Some applications may be able to catch the "out of memory" exception event from the virtual machine and include code for recovery. Recovery code is very difficult to write because it depends upon when the event occurs and at which place in the application code. Furthermore, running recovery code upon an out of memory exception may require additional memory resources which may not be available to the application at this point.

Most techniques try to manage these situations by pre-allocating a certain amount of memory at the application start-up and releasing it when an out of memory condition occurs to allow the system to be able to accomplish a recovery action. The main drawback of such techniques is that they are reactive. The operation that gets interrupted because of the out of memory error may not be easily recoverable and may leave data inconsistencies if the recovery handler code is not "near" enough to the code that threw the exception. Additionally, trying a recovery action after an out of memory error may be too late for certain kinds of applications.

A standard way to prevent out of memory exceptions is to use a garbage collection mechanism for detecting and freeing memory which is no longer in use. A garbage collector program (GC) running on a virtual machine which provides an application programming interface (API) to be monitored is activated each time a predefined percentage of memory is in use. Once activated, the garbage collector program reclaims memory no longer needed by a given application running on the virtual machine. One advantage is that the garbage collection relieves programmers from freeing allocated memory in the application code. One disadvantage of a garbage collector to be taken into account for optimizing memory usage of an application running on a virtual machine is that its execution adds an overhead that can affect the executing application. The garbage collection activity requires more CPU time than would have been required if the application explicitly itself freed unnecessary memory. Finally, garbage collection algorithms may be very sophisticated to avoid the drawbacks and may not only be able to free some memory space for one application but also be able to de-fragment the memory space for the virtual machine. The freeing of memory and de-fragmenting are different functions of the garbage collector which are both provided because de-fragmenting the memory is usually required for having larger blocks of free memory. De-fragmenting is not done in general at each garbage collector cycle but each time the garbage collector decides it is necessary.

Besides the out of memory exceptions, the memory leak condition for a virtual machine is detected, which is a loss of memory available over time. Detecting the memory leaks allow predicting when an out of memory exception is likely to occur. This solution can be used to test if the applications running on the virtual machine will correctly release memory after it has been used. Once again, the remedies to avoid memory leak or out of memory exceptions are just advising the administrator or stopping a process running on the virtual machine.

Finally, low memory conditions are generally very disruptive for the application functionality. Under low memory conditions, the application performances usually degrade a lot because of the increased garbage collector activity. When a virtual machine is running near its upper memory limit, most of the CPU time is spent on the garbage collector activity instead of application processing. So it should be avoided as much as possible to have an application running in such conditions.

Hence, memory usage of an application running on a virtual machine needs to be dynamically optimized while minimizing the drawbacks discussed above.

BRIEF SUMMARY

In one embodiment of the present invention, a method for optimizing memory usage of an application running on a virtual machine, the virtual machine providing a monitoring application programming interface (API) to communicate with the virtual machine and the virtual machine including a garbage collector, the method comprises self-allocating a virtual machine memory block. The method further comprises periodically collecting and storing virtual machine memory usage statistics. Additionally, the method comprises periodically computing an average virtual machine memory usage from the memory usage statistics in a time window. Furthermore, the method comprises entering into a recovery mode by releasing the virtual machine memory block and forcing the running application to reduce its processing activity in response to the computed virtual machine memory usage average becoming higher than a first threshold. In addition, the method comprises entering, by a processor, into a normal mode by re-self-allocating the virtual machine memory block and forcing the running application to resume its normal processing activity in response to the computed memory usage average becoming lower than a second threshold.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The principles of the present invention disclose a proactive system that continuously monitors the available memory and the garbage collector activity for an application running on a virtual machine including a garbage collector function and providing an application programming interface (API) for computing resource monitoring. One advantage of the present invention is that the system not only detects that the virtual machine reaches a low memory condition but also takes appropriate corrective actions to prevent the system from reaching and exceeding its limits.

To achieve this goal, the principles of the present invention take advantage of the period when the virtual machine is "idle" to start garbage collection activity. Also, the system detects a low memory condition when the garbage collector activity is increasing for a certain amount of time while the available free memory is continuously decreasing under a certain threshold; it notifies the application, which initiates a set of activities aimed at reducing the overall processing activities upon receiving such notification. A "hedge technique" is used by pre-allocating, at the application start-up, a certain amount of memory to be released and used in case a recovery action is required: when the application is notified of a low memory condition, the system releases the memory allocated at startup and forces a recovery action from the application. The system also notifies the application in case the available free memory comes back and re-exceeds a specified threshold. Upon receiving such notification, the application code resumes its normal activities and the system additionally, re-allocates the memory which was previously released.

By combining the release of memory allocated to the application at start-up time to the application activity reduction, the garbage collector will benefit of a larger amount of free memory to optionally de-fragment the system memory space and the application may execute the activity reduction with a larger amount of free memory, thus avoiding an out of memory exception.

Figure 1:
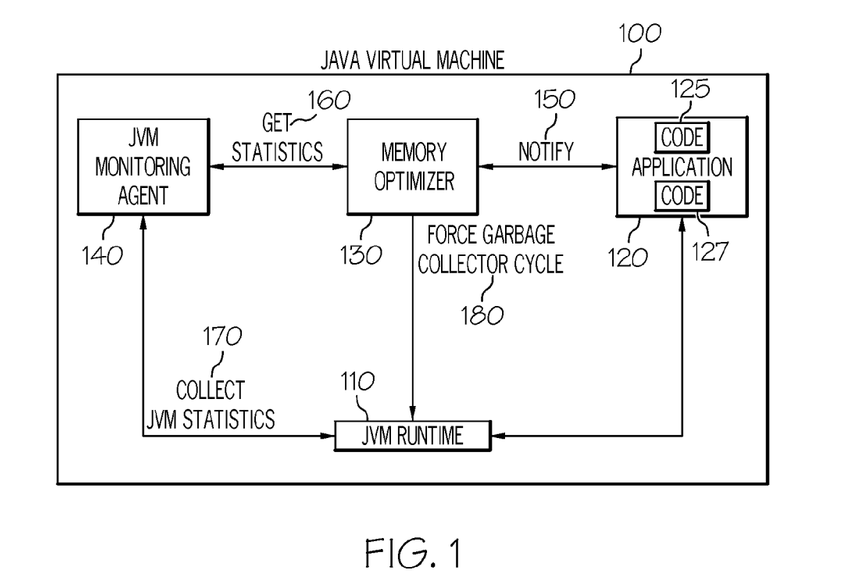
FIG. 1 illustrates a system environment for optimizing the memory usage of an application in accordance with an embodiment of the present invention.

Referring now to the drawings, FIG. 1 illustrates the system environment for optimizing the memory usage of a Java® application according to an embodiment of the present invention. FIG. 1 illustrates one common example of a virtual machine, which is a Java® virtual machine (JVM) 100 operating on a computer (discussed further below in connection with FIG. 5). The JVM runtime 110 executes bytecodes, compiled Java language code, on said computer of a Java® language compiled application 120. Java® virtual machine 100 comprises a garbage collector (included, not represented in FIG. 1) and provides an API for monitoring computing resources, and more particularly, memory and CPU as well as the activity of the garbage collector, which allow implementation of the application memory usage optimization.

The new components which are part of the embodiment of the present invention are computer programs respectively executing JVM computing resource monitoring (JVM monitoring agent 140) and memory optimization (memory optimizer 130). It is noted that these two components performing the memory optimization process can be located outside the virtual machine in a remote server and can be connected to the virtual machine through the network. Two pieces of code (125, 127) in the application are used to implement notifications by memory optimizer 130 and for reducing/restoring the application activity in case of a notification of low memory by memory optimizer 130 as described hereunder in reference to the description of the next Figures.

It is noted that this illustration of the system environment comprises only one Java application: this is the most common pattern having one application running on a virtual machine. As a matter of fact, running more than one application on the same virtual machine may have several drawbacks in the context of fail over and tolerance. This architecture applies also particularly to the type of applications supporting no unexpected interruption as running in production mode in an enterprise or implementing, for instance, a constant management and control of systems over enterprise locations. These applications have been modified (125, 127) according to an embodiment of the present invention to support the memory management optimization.

By the way, because the garbage collector is part of the virtual machine and does not distinguish between the memory allocated by one application and by another one, when the memory is freed, it is done not at the level of one application but at the level of the entire virtual machine. More generally, the VM monitoring is made at the level of the entire virtual machine. Consequently, in the case where there is more than one application running on a virtual machine, the system to optimize memory management may be implemented but its effectiveness is reduced. For instance, all the applications running on JVM 100 may be enabled to interact with memory optimizer component 130: they will receive the low memory notifications and will take appropriate actions to reduce memory usage. One other option would be to enable only one set of applications for receiving notifications from memory optimizer 130.

JVM monitoring agent 140 collects the statistics (170) (e.g., garbage collector activity, memory, CPU usage, etc.) required by optimizer 130 (memory optimizer 130 gets the statistics 160) for its internal processing. In the modern JVM runtimes, it may retrieve such data using the Java® Management Extensions (JMX) management interface that almost all the vendors provide. Memory optimizer 130 is the engine that analyzes and processes the data received from monitoring agent 140 and that, according to its configuration, decides about the corrective actions to be taken for maintaining the availability of the monitored application via notifications to the application (150) and releasing to JVM 100 of the pre-allocated memory block. Memory optimizer 130 can also force the garbage collector to execute a garbage collector cycle (180) when JVM 100 is idle to anticipate future use of the memory by the application. Forcing a garbage collector cycle in this circumstance is optional because it may be not necessary.

Figure 2:
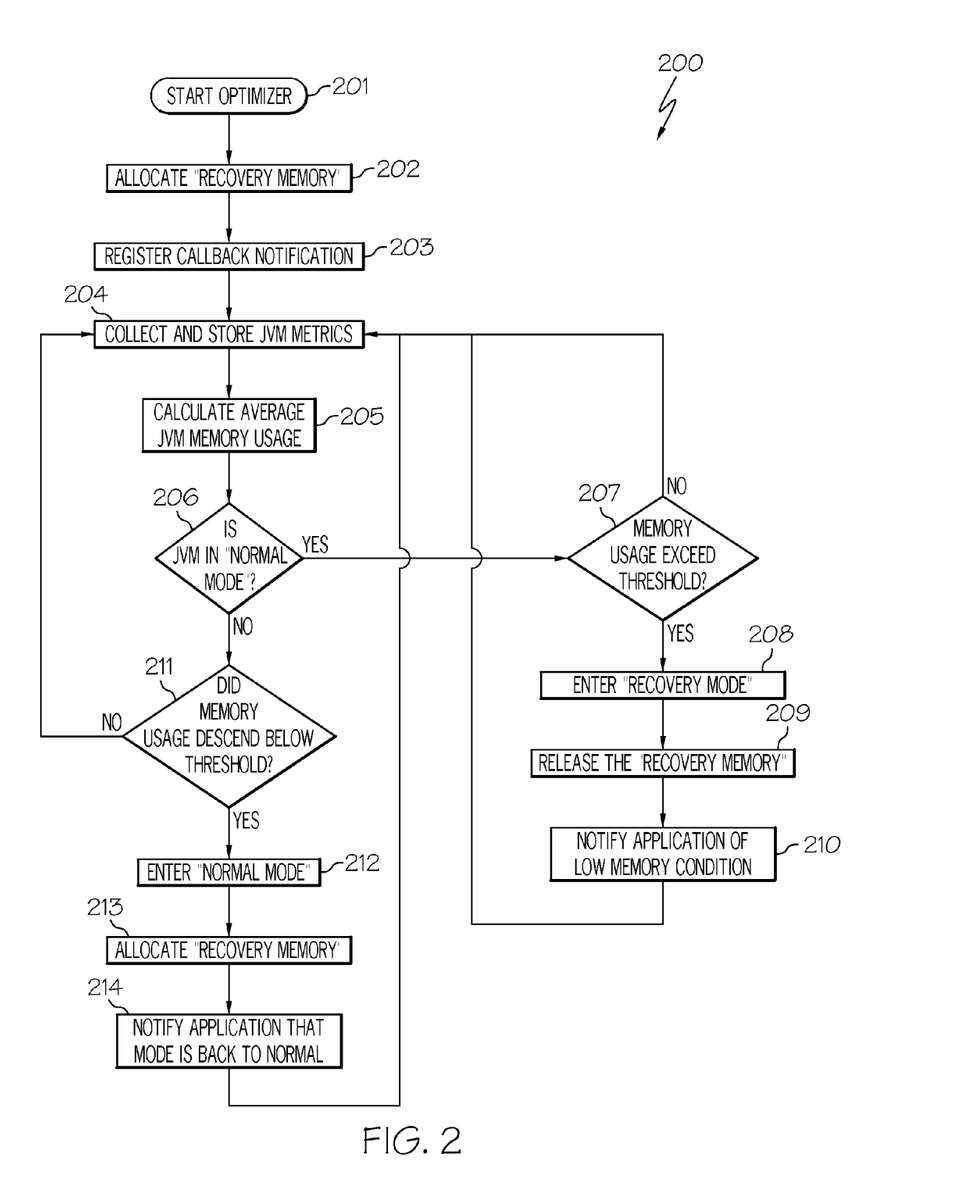
FIG. 2 is a flowchart of a method for optimizing the memory usage of an application in accordance with an embodiment of the present invention.

FIG. 2 is a flowchart of a method 200 for optimizing the memory usage of a Java® application according to an embodiment of the present invention. The example of a Java® virtual machine is still used in the description of the steps of method 200.

Referring to FIG. 2, in conjunction with FIG. 1, in step 201, a new Java® application for which the memory usage will be optimized according to one embodiment gets started along with memory optimizer engine 130 and JVM monitoring agent 140. As soon as memory optimizer engine 130 gets started, in step 202, it pre-allocates a certain configurable amount of memory to be used during the "recovery" phases. The size of the pre-allocated block of memory may be a configurable parameter of memory optimizer 130, the value depending on the particular application and system context. The parameter value may be decided by the system administrator upon his/her experience of the computing environment.

In step 203, the application executes the code for requesting to be notified by memory optimizer engine 130 about "low memory" conditions: in one embodiment, the application registers a callback notification object to memory optimizer engine 130 to be notified. Callback is the typical way of sending notifications between two programs.

In step 204, the JVM monitoring engine 140, at regular time intervals, contacts the JVM using the JVM monitoring API to collect metrics about the available/used memory, the JVM garbage collector activity and the process CPU usage; these data are periodically provided by JVM monitoring engine 140 to memory optimizer 130. There are many possibilities for implementing this process of collecting data as well known in the art. For instance, memory optimizer 130 at regular intervals may ask monitoring agent 140 to retrieve JVM metrics. Another possibility could be that monitoring agent 140, independently from memory optimizer 130, periodically gets the JVM parameters and send them back to optimizer 130 through a notification mechanism. Memory optimizer 130 when getting these statistics stores them in its internal historical repository. A separate thread into memory optimizer 130 at regular intervals, in general different from the time intervals used by JVM monitoring agent 140 to send the data, infers the resource utilization (e.g., memory, CPU and garbage collector (GC) activity) from a historical analysis of the memory and GC metrics: it calculates in step 205 the average values for those parameters using an evaluation window that starts from the current timestamp and goes back in time up to a pre-defined configurable limit, as discussed later herein in connection with the description of FIG. 4.

In step 206, a determination is made as to whether the JVM is in "normal mode." When the application stars running, the JVM is in normal mode. A JVM state indicator (a programming variable for instance) can be set by memory optimizer 130 to a certain value representing "normal mode." If the JVM is in "normal mode," then a determination is made in step 207 as to whether the memory usage exceeds a threshold. If memory optimizer 130 detects that the calculated average "used" memory exceeds a pre-defined threshold, Th2, then, at this point, the JVM enters into a "recovery mode" in step 208. The JVM state indicator is set to "recovery mode" corresponding to a certain value.

It is noted that the average memory usage can also be satisfying and that no action is started if the calculated average "used" memory does not exceed the Th2 threshold; in this case, the process goes back to collecting and storing JVM metrics in step 204.

When switching to recovery mode in step 208, memory optimizer 130 releases the pre-allocated memory block in step 209 to the runtime environment; the memory optimizer 130 also triggers a notification in step 210 of low memory condition to the running application by means of the registered callback object. The process then goes back to collecting and storing JVM metrics in step 204.

Upon receiving the "low memory" condition notification, the application starts a set of "recovery" actions aimed at reducing its internal processing activities until the low memory condition get normalized.

Memory optimizer 130 has released the pre-allocated memory to JVM 100 to help the application to perform the activity reduction and to help the garbage collector action of freeing memory. Additionally, memory optimizer 130, as recovery action, may force a garbage collector cycle in JVM 100 if it appears necessary.

Referring to step 206, if JVM 100 is not operating in "normal mode," then JVM 100 is still in 'Recovery mode' (answer No to step 206) and the efficiencies of the recovery actions are tested. In step 211, a determination is made as to whether the memory usage descended below a threshold, Th1. If the memory usage is not below a threshold, Th1, then, the process goes back to collecting and storing JVM metrics in step 204.

A certain number of measurement periods may be necessary, but when, after a certain number of loops, the average "used" memory finally descends below the alert threshold Th1, then JVM 100 returns to "normal mode" in step 212, where memory optimizer 130 sets the JVM state indicator to normal mode. In step 213, memory optimizer 130 re-allocates the memory block for preparing the next recovery in case a low memory condition occurs; it also sends a notification in step 214 to the running application that the mode is back to the normal situation. The use of the two thresholds implements a sort of hysteresis mechanism to avoid immediately reacting when small oscillations of the memory usage occur around the configured limit. The process then goes back to collecting and storing JVM metrics in step 204.

Upon receiving the notification that JVM 100 is now in normal mode, the application resumes its normal internal processing activities until the low memory condition gets normalized.

As already mentioned before, the application includes some code for supporting the optimization of memory usage which includes code for receiving notifications from memory optimizer component 130 and code for reacting at reception of the notifications by reducing the application activity (e.g., reading, writing computing may use a lot of memory) or restoring its expected normal processing upon reception of a notification that the mode has returned to a normal situation sent by memory optimizer component 130.

In some implementations, method 200 may include other and/or additional steps that, for clarity, are not depicted. Further, in some implementations, method 200 may be executed in a different order presented and that the order presented in the discussion of FIG. 2 is illustrative. Additionally, in some implementations, certain steps in method 200 may be executed in a substantially simultaneous manner or may be omitted.

Figure 3:
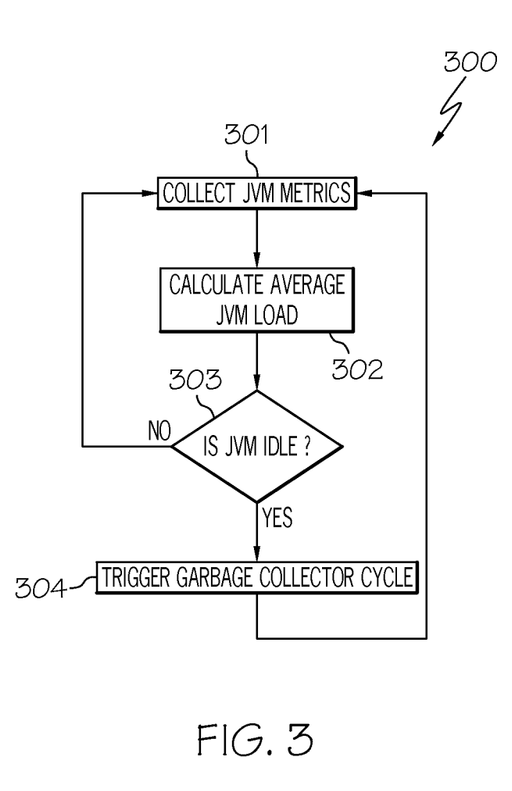
FIG. 3 is a flowchart of an optional process in the method for optimizing the memory usage of an application in accordance with an embodiment of the present invention.

FIG. 3 is a flowchart of an optional process 300 in method 200 for optimizing the memory usage of a Java® application according to an embodiment of the present invention. This optional process 300 is executed in parallel (on a separate thread in JVM 100) to the general flowchart as described in FIG. 2.

Referring to FIG. 3, in conjunction with FIGS. 1-2, asynchronously from the previous activities, memory optimizer 130 periodically collects JVM metrics in step 301 (through JVM monitoring agent 140) and computes in step 302 an average of the CPU usage and garbage collector activity of the JVM in an evaluation window. In step 303, a determination is made as to whether JVM 100 is idle.

If JVM 100 is not idle, then memory optimizer 130 periodically collects JVM metrics in step 301. If, however, JVM 100 is almost idle (i.e., no garbage collector activity and low CPU usage), then, in step 304, it triggers a preventive garbage collector cycle to free as much unused memory as possible when it is not detrimental to application activity. The time interval for the check of idle periods is different from the one used to check the low memory conditions and in general it is represented by a larger value (i.e., this kind of check is performed less frequently than the one to check the memory usage). This specific preventive memory cleaning is optional that is not required in all cases. It mainly depends on how the garbage collector system has been implemented in the virtual machine. The detection of an idle period (i.e., no garbage collector activity and low CPU usage) may be tuned through the use of a memory optimizer parameter by the system administrator.

Upon triggering the garbage collector cycle, memory optimizer 130 collects JVM metrics in step 301.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Figure 4:
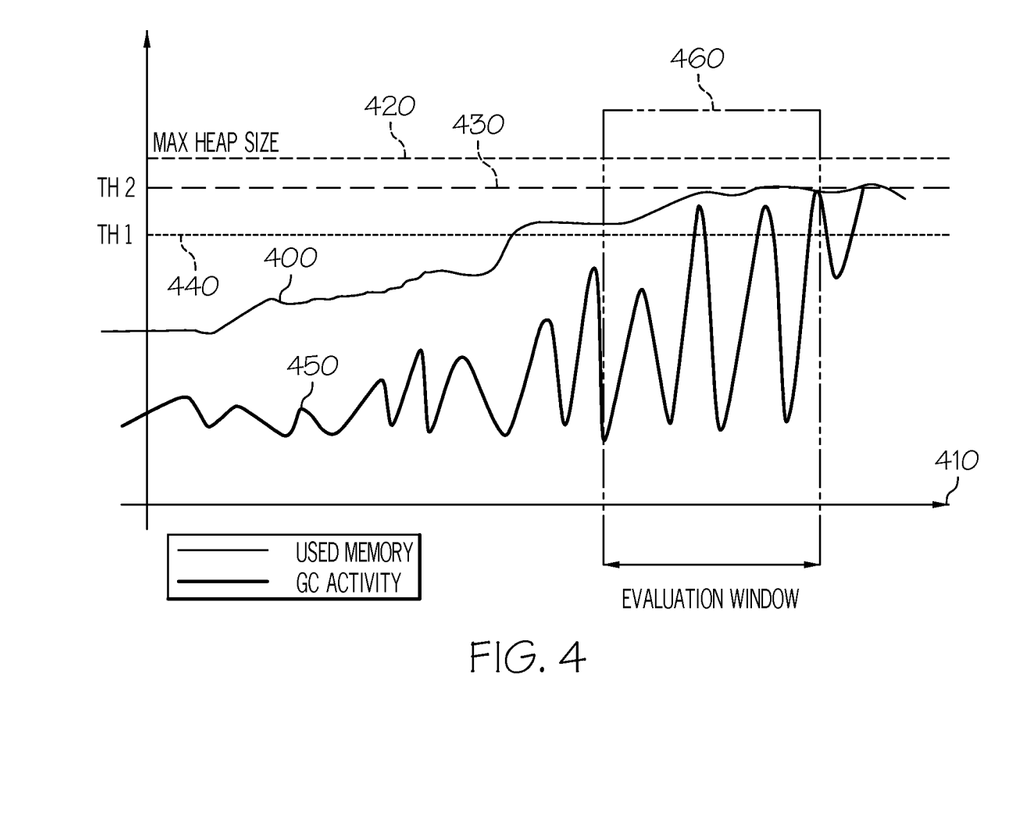
FIG. 4 shows the curves representing the values varying with the time of the memory usage and garbage collector activity of a running application when the memory usage is optimized according to an embodiment of the present invention.

FIG. 4 shows the curves representing the values varying with the time of the memory usage and garbage collector activity of a running Java® application when the memory usage is optimized according to an embodiment of the present invention. The memory usage curve 400 provides the memory usage parameter values varying with the time on the x axis 410. The max heap size is the maximum value of the memory used by the Java® application for creating a condition of out of memory exception (heap is an area of memory reserved for data that is created when a program is executed). This max value 420 is never reached with the memory usage optimization of the present invention provided that the applications take timely recovery actions when notified about the low memory condition. Furthermore, as illustrated in FIG. 4, the Th2 threshold 430, which represents a memory usage value for a low memory condition and which starts the process for recovery, is a maximum value of the memory usage, even if, the Th2 value 430 may be in general exceeded during the recovery phase since a few moments have to elapse for the recovery actions done by the application to have a tangible effect. The garbage collector curve 450 represents variation with the time of the garbage collector activity which is also measured. Periodically, memory optimizer 130 (FIG. 1) computes the Java® application memory usage in a window of time, the evaluation window 460. In evaluation window 460 of FIG. 4, memory optimizer 130 computes the average value of the memory usage and as it has reached the Th2 threshold 430 for low memory condition, it will start action for recovering from this situation. It is noted that, as expected, during this evaluation window 460, the garbage collector activity becomes very high and needs more memory for freeing the Java® application unused memory in this situation.

The recovering action triggered by memory optimizer 130 in case a low memory condition is detected consists of notifying the running application which will reduce its activity to decrease its CPU consumption and memory usage; also memory optimizer 130 releases the pre-allocated memory block for its use by JVM 100 and particularly by the garbage collector of JVM 100. The release of memory helps the garbage collector and the application to more safely and efficiently complete their tasks during the memory peak periods. These recovery actions achieve two goals:

Helps the garbage collector that, with a larger amount of free memory, is able to more efficiently de-fragment the heap space.

Helps the application that, with a larger amount of free memory can safely perform its "activity reduction" actions without incurring an out of memory exception.

As an additional proactive action, the optimizer 130 may periodically force a garbage collector cycle. This is not strictly needed and in some cases may not be necessary. For example, good garbage collectors may directly do this activity by themselves, while other ones do not do this.

When, in a next evaluation window 460, memory optimizer 130 computes that the average memory usage for the Java® application is under an alert threshold Th1 440, it notifies the application which returns to normal activity. Additionally, memory optimizer 130 re-allocates the block of memory previously released.

The Th1 memory usage alert threshold value 440 is lower than the Th2 low memory condition threshold value 430, where Th1 and Th2 are determined by the experience of the system administrator.

Not illustrated in FIG. 4, the preventive action of memory optimizer 130 to optimize memory usage is for forcing deep garbage collection cycle during low CPU activity.

It is noted that the applications which have their memory usage managed by the method of the present invention have code included to interface with memory optimizer 130 (callback is the most usual way to implement notification between programs) and code to reduce activity (CPU and memory usage) and code to re-establish normal activity.

Compared to the existing solutions in the field for optimizing memory usage of applications running on a virtual machine providing a monitoring API and including a garbage collector, this system is pro-active and adds the following new elements:

Historical and combined analysis of both CPU Usage, GC activity and free memory availability to decide about the corrective actions to be taken (e.g., forced GC cycle, application notification).

Notification mechanism based on a set of two different pairs of alert thresholds (with a hysteresis mechanism) that allows notifying the application not only when an alert condition arises, but also when the system comes back to a "normal" condition so that the application can resume its full functional state.

The pre-allocation and release of a memory block to help the garbage collector and the application to more safely and efficiently complete their tasks during the memory peak periods.

Figure 5:
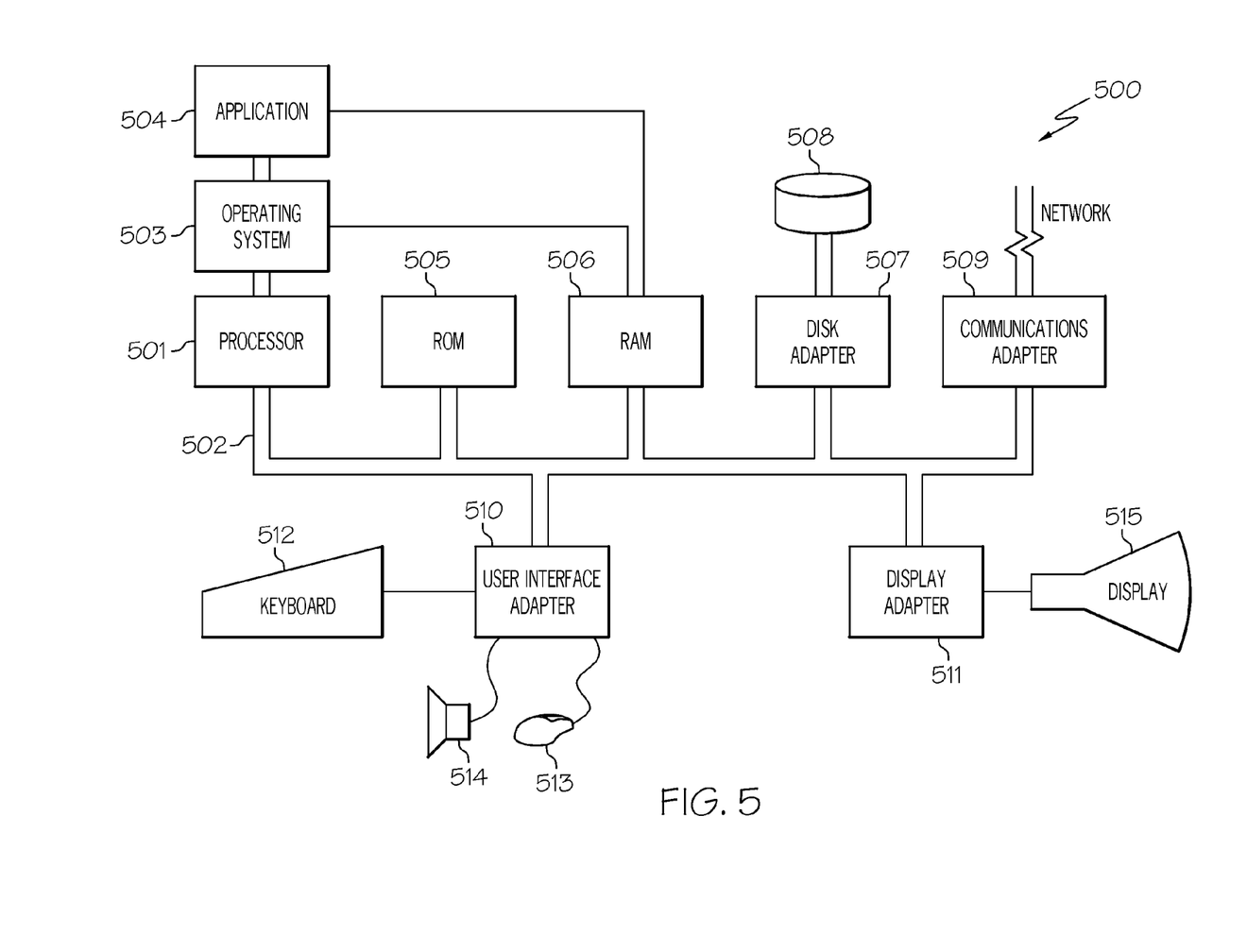
FIG. 5 depicts an embodiment of a hardware configuration of a computer system which is representative of a hardware environment for practicing the present invention.

FIG. 5 depicts an embodiment of a hardware configuration of a computer system 500 which is representative of a hardware environment for practicing the present invention. Referring to FIG. 5, computer system 500 has a processor 501 coupled to various other components by system bus 502. An operating system 503 may run on processor 501 and provide control and coordinate the functions of the various components of FIG. 5. An application 504 in accordance with the principles of the present invention may run in conjunction with operating system 503 and provide calls to operating system 503 where the calls implement the various functions or services to be performed by application 504. Application 504 may include, for example, an application for optimizing memory usage of an application running on a virtual machine as discussed above.

Referring again to FIG. 5, read-only memory ("ROM") 505 may be coupled to system bus 502 and include a basic input/output system ("BIOS") that controls certain basic functions of computer system 500. Random access memory ("RAM") 506 and disk adapter 507 may also be coupled to system bus 502. It should be noted that software components including operating system 503 and application 504 may be loaded into RAM 506, which may be computer system's 500 main memory for execution. Disk adapter 507 may be an integrated drive electronics ("IDE") adapter that communicates with a disk unit 508, e.g., disk drive.

Computer system 500 may further include a communications adapter 509 coupled to bus 502. Communications adapter 509 may interconnect bus 502 with an outside network (not shown) thereby allowing computer system 500 to communicate with other similar devices.

I/O devices may also be connected to computer system 500 via a user interface adapter 510 and a display adapter 511. Keyboard 512, mouse 513 and speaker 514 may all be interconnected to bus 502 through user interface adapter 510. A display monitor 515 may be connected to system bus 502 by display adapter 511. In this manner, a user is capable of inputting to computer system 500 through keyboard 512 or mouse 513 and receiving output from computer system 500 via display 515 or speaker 514.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing memory usage of an application running on a virtual machine, said virtual machine providing a monitoring application programming interface (API) to communicate with said virtual machine and said virtual machine including a garbage collector, the method comprising:
    self-allocating a virtual machine memory block;
    periodically collecting and storing virtual machine memory usage statistics;
    periodically computing an average virtual machine memory usage from the memory usage statistics in a time window;
    entering into a recovery mode by releasing the virtual machine memory block and forcing the running application to reduce its processing activity in response to the computed virtual machine memory usage average becoming higher than a first threshold; and
    entering, by a processor, into a normal mode by re-self-allocating the virtual machine memory block and forcing the running application to resume its normal processing activity in response to the computed memory usage average becoming lower than a second threshold.

2. The method as recited in claim 1 further comprising:
    setting a virtual machine state indicator to the normal mode, and wherein the entering into the recovery mode and the entering into the normal mode further comprise:
    in response to the virtual machine state indicator being set to the normal mode and in response to the computed memory usage average exceeding the first threshold performing, the method further comprises:
        switching the state indicator from the normal mode into the recovery mode;
        releasing the self-allocated memory block to the virtual machine;
        notifying the running application that a low memory condition occurs to force the running application to reduce its processing activity; and
        returning to the periodically computing step;
    returning to the periodically computing step in response to the virtual machine state indicator being set to the normal mode and in response to the computed memory usage average not exceeding a maximum threshold;
    in response to the virtual machine state indicator being set to the recovery mode and in response to the computed memory usage average descending below the second threshold, the method further comprises:
        switching the state indicator from the recovery mode into the normal mode;
        self-allocating the virtual machine memory block;
        notifying the running application that the low memory condition occurs to force the running application to resume its normal processing activity; and
        returning to the periodically computing step; and
    returning to the periodically computing step in response to the virtual machine state indicator being set to the recovery mode and in response to the computed memory usage average not descending under the second threshold.

3. The method as recited in claim 2, wherein the running application performs an initial callback request to receive a notification and wherein the notifying of the running application comprises in sending a callback notification to the running application.

4. The method as recited in claim 1 further comprising:
    forcing the virtual machine to perform a garbage collector cycle in response to the virtual machine memory usage average becoming higher than the first threshold.

5. The method as recited in claim 1, wherein the first threshold value is greater than the second threshold value.

6. The method as recited in claim 1, wherein the first and second thresholds are set as configuring parameters.

7. The method as recited in claim 1 further comprising:
    testing if the virtual machine is idle; and
    forcing the virtual machine to perform a garbage collector cycle in response to the virtual machine being idle.

8. The method as recited in claim 7, wherein the testing if the virtual machine is idle comprises:
    periodically collecting and storing virtual machine CPU usage and garbage collector activity statistics;
    periodically computing an average virtual machine CPU usage and an average garbage collector activity from the collected and stored statistics; and
    testing if the computed virtual machine CPU usage average is lower than a configurable third threshold and if the garbage collector activity is null.

9. A computer program product embodied in a computer readable storage medium for optimizing memory usage of an application running on a virtual machine, said virtual machine providing a monitoring application programming interface (API) to communicate with said virtual machine and said virtual machine including a garbage collector, the computer program product comprising the programming instructions for:
    self-allocating a virtual machine memory block;
    periodically collecting and storing virtual machine memory usage statistics;
    periodically computing an average virtual machine memory usage from the memory usage statistics in a time window;
    entering into a recovery mode by releasing the virtual machine memory block and forcing the running application to reduce its processing activity in response to the computed virtual machine memory usage average becoming higher than a first threshold; and
    entering into a normal mode by re-self-allocating the virtual machine memory block and forcing the running application to resume its normal processing activity in response to the computed memory usage average becoming lower than a second threshold.

10. The computer program product as recited in claim 9 further comprising the programming instructions for:
    setting a virtual machine state indicator to the normal mode, and wherein the entering into the recovery mode and the entering into the normal mode further comprise:
    in response to the virtual machine state indicator being set to the normal mode and in response to the computed memory usage average exceeding the first threshold performing, the computer program product further comprises the programming instructions for:

switching the state indicator from the normal mode into the recovery mode;
release the self-allocated memory block to the virtual machine;
notifying the running application that a low memory condition occurs to force the running application to reduce its processing activity; and
returning to the periodically computing step;
returning to the periodically computing step in response to the virtual machine state indicator being set to the normal mode and in response to the computed memory usage average not exceeding a maximum threshold;
in response to the virtual machine state indicator being set to the recovery mode and in response to the computed memory usage average descending below the second threshold, the computer program product further comprises the programming instructions for:
switching the state indicator from the recovery mode into the normal mode;
self-allocating the virtual machine memory block;
notifying the running application that the low memory condition occurs to force the running application to resume its normal processing activity; and
returning to the periodically computing step; and
returning to the periodically computing step in response to the virtual machine state indicator being set to the recovery mode and in response to the computed memory usage average not descending under the second threshold.

11. The computer program product as recited in claim 10, wherein the running application performs an initial callback request to receive a notification and wherein the notifying of the running application comprises in sending a callback notification to the running application.

12. The computer program product as recited in claim 9 further comprising the programming instructions for:
forcing the virtual machine to perform a garbage collector cycle in response to the virtual machine memory usage average becoming higher than the first threshold.

13. The computer program product as recited in claim 9, wherein the first threshold value is greater than the second threshold value.

14. The computer program product as recited in claim 9, wherein the first and second thresholds are set as configuring parameters.

15. The computer program product as recited in claim 9 further comprising the programming instructions for:
testing if the virtual machine is idle; and
forcing the virtual machine to perform a garbage collector cycle in response to the virtual machine being idle.

16. The computer program product as recited in claim 15, wherein the programming instructions for testing if the virtual machine is idle comprises the programming instructions for:
periodically collecting and storing virtual machine CPU usage and garbage collector activity statistics;
periodically computing an average virtual machine CPU usage and an average garbage collector activity from the collected and stored statistics; and
testing if the computed virtual machine CPU usage average is lower than a configurable third threshold and if the garbage collector activity is null.

17. A system, comprising:
a memory unit for storing a computer program for optimizing memory usage of an application running on a virtual machine, said virtual machine providing a monitoring application programming interface (API) to communicate with said virtual machine and said virtual machine including a garbage collector; and
a processor coupled to the memory unit, wherein the processor, responsive to the computer program, comprises:
circuitry for self-allocating a virtual machine memory block;
circuitry for periodically collecting and storing virtual machine memory usage statistics;
circuitry for periodically computing an average virtual machine memory usage from the memory usage statistics in a time window;
circuitry for entering into a recovery mode by releasing the virtual machine memory block and forcing the running application to reduce its processing activity in response to the computed virtual machine memory usage average becoming higher than a first threshold; and
circuitry for entering into a normal mode by re-self-allocating the virtual machine memory block and forcing the running application to resume its normal processing activity in response to the computed memory usage average becoming lower than a second threshold.

18. The system as recited in claim 17, wherein the processor further comprises:
circuitry for setting a virtual machine state indicator to the normal mode, and wherein the entering into the recovery mode and the entering into the normal mode further comprise:
in response to the virtual machine state indicator being set to the normal mode and in response to the computed memory usage average exceeding the first threshold performing, the processor further comprises:
circuitry for switching the state indicator from the normal mode into the recovery mode;
circuitry for releasing the self-allocated memory block to the virtual machine;
circuitry for notifying the running application that a low memory condition occurs to force the running application to reduce its processing activity; and
circuitry for returning to the periodically computing step;
circuitry for returning to the periodically computing step in response to the virtual machine state indicator being set to the normal mode and in response to the computed memory usage average not exceeding a maximum threshold;
in response to the virtual machine state indicator being set to the recovery mode and in response to the computed memory usage average descending below the second threshold, the processor further comprises:
circuitry for switching the state indicator from the recovery mode into the normal mode;
circuitry for self-allocating the virtual machine memory block;
circuitry for notifying the running application that the low memory condition occurs to force the running application to resume its normal processing activity; and
circuitry for returning to the periodically computing step; and
circuitry for returning to the periodically computing step in response to the virtual machine state indicator being set to the recovery mode and in response to the computed memory usage average not descending under the second threshold.

19. The system as recited in claim 18, wherein the running application performs an initial callback request to receive a notification and wherein the notifying of the running application comprises in sending a callback notification to the running application.

20. The system as recited in claim 17, wherein the processor further comprises:
   circuitry for forcing the virtual machine to perform a garbage collector cycle in response to the virtual machine memory usage average becoming higher than the first threshold.

21. The system as recited in claim 17, wherein the first threshold value is greater than the second threshold value.

22. The system as recited in claim 17, wherein the first and second thresholds are set as configuring parameters.

23. The system as recited in claim 17, wherein the processor further comprises:
   circuitry for testing if the virtual machine is idle; and
   circuitry for forcing the virtual machine to perform a garbage collector cycle in response to the virtual machine being idle.

24. The system as recited in claim 23, wherein the circuitry for testing if the virtual machine is idle comprises:
   circuitry for periodically collecting and storing virtual machine CPU usage and garbage collector activity statistics;
   circuitry for periodically computing an average virtual machine CPU usage and an average garbage collector activity from the collected and stored statistics; and
   circuitry for testing if the computed virtual machine CPU usage average is lower than a configurable third threshold and if the garbage collector activity is null.

\* \* \* \* \*